Sept. 22, 1925.  
S. LAKE  
MOLDING APPARATUS  
Filed March 17, 1925  
1,554,586  
2 Sheets-Sheet 2
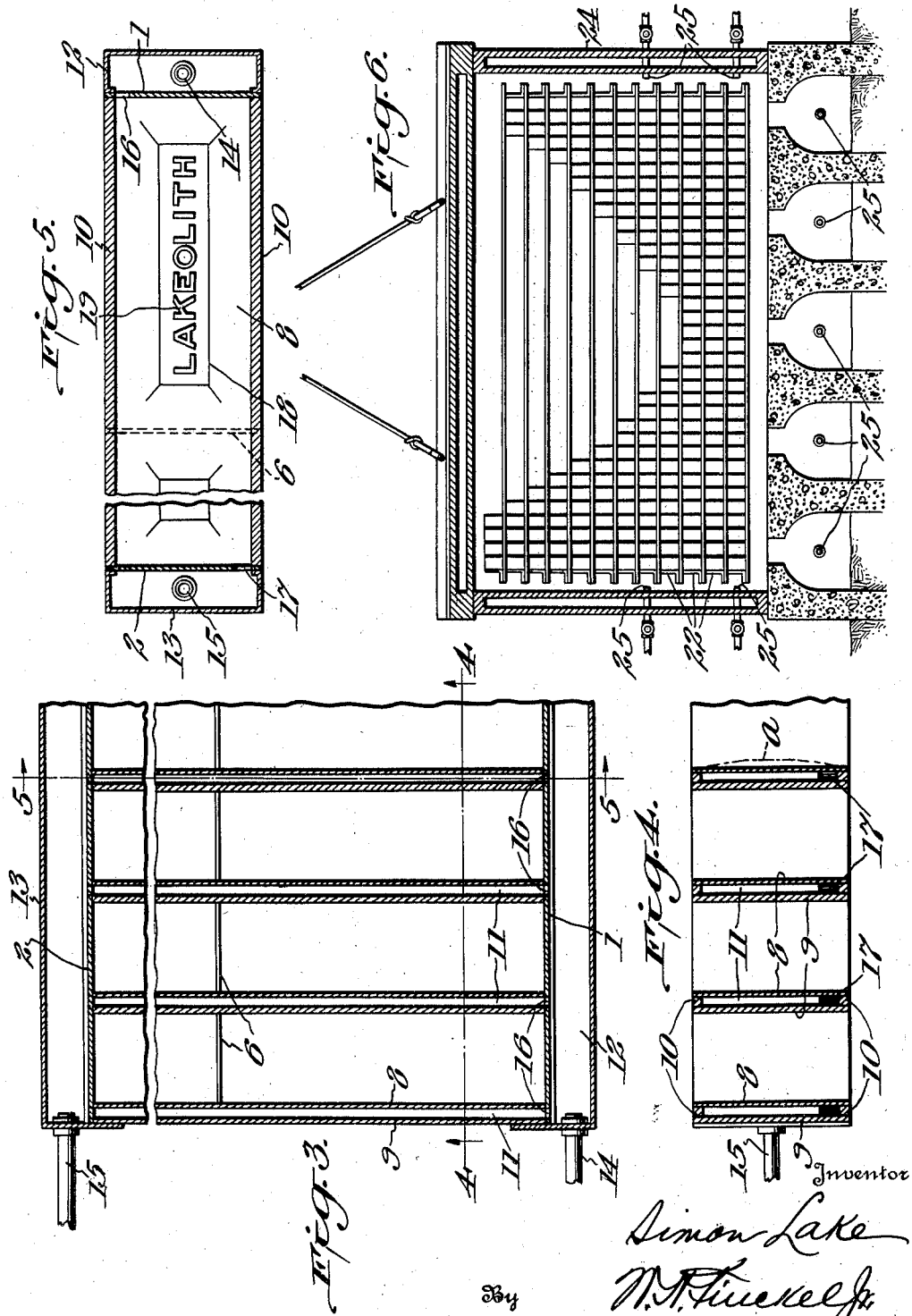
Inventor  
Simon Lake  
By  
Attorney Patented Sept. 22, 1925.

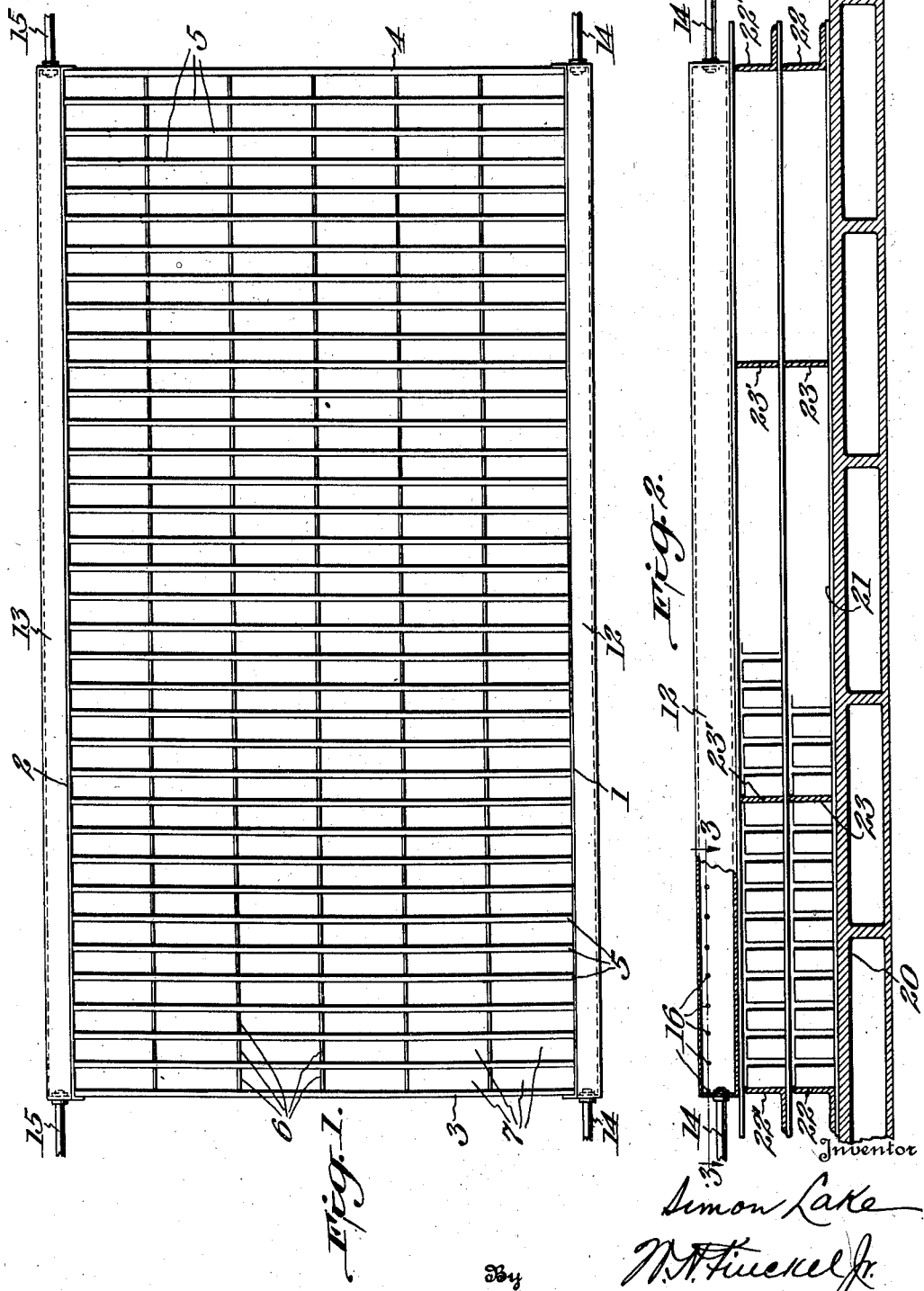

1,554,586

UNITED STATES PATENT OFFICE.

SIMON LAKE, OF MILFORD, CONNECTICUT.

MOLDING APPARATUS.

Application filed March 17, 1925. Serial No. 16,141.

*To all whom it may concern:*

Be it known that I, SIMON LAKE, a citizen of the United States, residing at Milford, in the county of New Haven and State of Connecticut, have invented a certain new and useful Improvement in Molding Apparatus, of which the following is a full, clear, and exact description.

One object of this invention is to provide an apparatus for molding or casting concrete or clay or the like blocks or bricks in large numbers simultaneously, and in rapidly drying and curing such blocks or bricks, to the end that they may be moved or handled without damage a short time after the molding operation is completed.

Another object of the invention is the provision of apparatus by means of which blocks or bricks may be cast or molded in superposed layers or tiers with curtains or plates separating such layers or tiers, such molding being accomplished successively by means of re-use of the same mold box, the rapid drying of the blocks or bricks making possible removal of the mold box from the blocks or bricks a short time after completion of the molding operation, and thus rendering the mold box available for subsequent molding of blocks or bricks in superposition upon those already molded.

A still further object of the invention is to mold blocks or bricks in such a manner, and to so dry and cure them, that they need not be handled or moved until they are completely cured and ready for storage or shipment.

The invention consists, essentially in a molding apparatus for molding or casting large numbers of blocks or bricks simultaneously, comprising a mold box provided with partitions forming a plurality of similar mold chambers, certain of such partitions being of double-wall formation and affording between their walls spaces into which may be introduced a heating fluid or medium for the purpose of accelerating the drying of the blocks or bricks, and headers communicating with opposite ends of all of the partition spaces for supplying the heating medium thereto and exhausting it therefrom. And the invention consists further in a housing adapted to be positioned over and to completely enclose a stack or pile of superposed layers of cast or molded blocks or bricks and in which they may be dried, cured or kilned, as I will proceed now to explain and finally claim.

In the accompanying drawings illustrating the invention, in the several figures of which like parts are similarly designated, Figure 1 is a plan view of the mold box of my apparatus. Fig. 2 is a sectional side elevation illustrating the molding of blocks or bricks in superposed separate layers or tiers. Fig. 3 is an enlarged fragmentary section taken on the line 3—3 of Fig. 2. Fig. 4 is a section taken on the line 4—4 of Fig. 3. Fig. 5 is a section taken on the line 5—5 of Fig. 3. Fig. 6 is a sectional elevation illustrating the curing or kilning of a stack or pile of superposed layers or tiers of blocks or bricks in the housing of my apparatus.

The mold box illustrated in full in Fig. 1 comprises sides 1 and 2 and ends 3 and 4, and is divided longitudinally by a plurality of transversely arranged partitions 5, which, with the longitudinal partition members 6 divide the mold box into a plurality of mold chambers 7 of a shape and size to produce blocks or bricks having predetermined desired characteristics.

The ends 3 and 4 and partition members 5 are of double-wall construction, having the walls 8 and 9 joined at their top and bottom edges to narrow strips 10 and forming between them the closed spaces 11 for the reception of a heating medium.

Carried against the sides 1 and 2 are headers 12 and 13, respectively, provided with pipe connections 14, 14 and 15, 15 respectively at their ends, the header 12 being an intake header and the header 13 being an exhaust or outlet header, or vice versa, as will be hereinafter pointed out.

The header 12 communicates with the spaces 11 of the partitions 5 through openings 16 located near their upper edges (Figs. 2, 3 and 5) and the header 13 communicates with the spaces 11 through openings 17 located near their lower edges (Figs. 4 and 5). By this means it will be seen that a heating medium admitted to the header 12 will circulate through the spaces 11 of all of the partitions 5 and will be exhausted therefrom through the header 13, or vice versa, as will hereinafter appear.

If desired, one wall 9 of the partitions 5 may be of relatively heavy material, and the other wall 8 of relatively light material, the wall 8 being formed accordingly, with an indented or recessed portion 18 (Fig. 5) which may bear a trademark 19, as shown, or the name of the manufacturer, or any other desired indicia, and, during the molding operation, may be forced by pressure introduced into the spaces 11 to bulge out, as indicated at a Fig. 4, to impress the indicia carried by it in the block or brick being molded. When the pressure is relieved the wall will spring back to its normal position to permit withdrawal of the mold box from the blocks or bricks. Obviously, this particular construction is optional, and the two walls 8 and 9 may be of the same weight material and perfectly plain, if desired.

In using my apparatus, the following procedure will be found to give very satisfactory results: The mold box is placed upon a casting table of ordinary construction, or the steam-heated table 20 and steel curtain or spacer 21 (Fig. 2) of the invention of my copending application filed May 6, 1924, Serial No. 711,419 may be used. Then concrete, grout, or clay, depending upon the kind of blocks or bricks to be made, is flowed over its whole upper surface until all of the mold chambers 7 are completely filled. Then live steam is introduced into the header 12 through the pipes 14, 14 from which it passes substantially simultaneously into all of the spaces 11 of the partitions 5 through the openings 16, and after travelling the full length of the partitions escapes through the openings 17, header 13 and pipes 15. This heating may be continued as long as desired, and during such time the blocks or bricks will be dried out to an extent to permit the removal of the mold box, the blocks or bricks having attained such a set as to render them self-supporting.

It may be found that the introduction of live steam into the spaces 11 in the manner just described will dry out the blocks or bricks more rapidly than is desired and if such be the case, the steam may be admitted to the spaces 11 through the pipes 15, 15, header 13 and openings 17, where, coming in contact with the relatively cold walls 8 and 9 it will condense, and the hot water of condensation will fill the spaces 11 and finally overflow therefrom through the openings 16, header 12 and pipes 14, 14. This last described heating operation will, obviously, have a slower drying effect upon the blocks or bricks and may, in some cases, be preferably to that first described.

Instead of using steam, hot or warm water may be used as the heating medium and if so it will be introduced into the spaces 11 in the same manner as that last set forth in which steam is introduced, that is, through the pipes 15, 15 and header 13.

No matter in which of these manners the heating medium is introduced into the spaces 11, it will be apparent that, due to the employment of the headers 12 and 13, it will enter all of the spaces substantially simultaneously.

The pressure introduced into the spaces 11 may be so controlled by means of valves (not shown) in the pipes 14, 14 and 15, 15 as to operate upon the indented indicia-bearing walls 8, as hereinbefore set forth.

When the steam heated casting table 20 (Fig. 2) is used, steam or hot water may be introduced into same to assist in drying the blocks or bricks.

After a molding operation has been completed and the mold box removed, the steel curtain may be withdrawn, as set forth in my application above mentioned, angle members 22 so placed as to confine the molded blocks or bricks, intermediate supporting members 23 inserted between the blocks or bricks at suitable intervals, as shown in Fig. 2, and the steel curtain again positioned, as shown at 21' resting upon the angle members 22 and supporting members 23, and the molding operation repeated. After completion of this molding operation the angle members 22' and supporting members 23' may be position, the steel curtain again applied, and another molding operation carried out, and so on until a stack or pile of superposed layers or tiers of blocks or bricks of desired height has been formed.

Then the housing 24 (Fig. 6) may be lowered over the whole pile and steam or warm, moist or humidified air introduced thereinto to complete the drying or curing of the blocks or bricks. This curing may be done after completion of the day's work.

If, instead of the steel curtain, I use separate steel plates to separate the layers or tiers of the pile, these plates are allowed to remain in the pile.

If it is desired to burn or kiln the blocks or bricks, particularly when they are made of clay, the housing 24 will be of fireproof material, and gas or oil flames supplied by the burners 25 may be used to provide the necessary heat, also the steel plates will be removed.

It will thus be seen that my apparatus is well adapted for rapid quantity production of blocks or bricks, and that the blocks or bricks may be molded in superposed layers or tiers and allowed to so remain until they are completely cured, thus obviating the necessity for handling them several times during their process of manufacture, and thereby decreasing the amount of labor required for their production as compared with that necessary where other apparatus now commonly employed is used.

The apparatus is to be understood as susceptible of various changes within the spirit of the invention and the scope of the following claims.

What I claim is:—

1. A molding apparatus, including a mold box having a plurality of partition members dividing it into a plurality of mold chambers, certain of said partitions providing within themselves spaces for the reception of a heating medium, a header arranged in cooperative relation to said mold box and communicating with one end of said spaces, a separate header communicating with the other end of said spaces, and means for introducing a heating medium into one of said headers and thence into said spaces and for exhausting it therefrom through the other of said headers.

2. A molding apparatus, including a mold box having a plurality of partition members dividing it into a plurality of mold chambers, certain of said partitions providing within themselves spaces for the reception of a heating medium, means including a pair of independent headers in communication with all of said spaces and through said spaces with each other for introducing a heating medium into all of said spaces substantially simultaneously, and means including the communications between said headers and spaces whereby the direction of flow of heating medium may be reversed at will.

3. A molding apparatus, including a mold box having a plurality of similar double-walled partition members dividing it into a plurality of mold chambers, the walls of said partitions forming between them spaces for the reception of a heating medium, a header communicating with one end of all of said spaces, a header communicating with the other end of all of said spaces, and means for introducing a heating medium into one of said headers and therethrough to all of said spaces and for withdrawing it through the other header substantially simultaneously.

4. A molding apparatus, including a mold box having a plurality of similar double-walled partition members dividing it into a plurality of mold chambers, the walls of said partitions forming between them spaces for the reception of a heating medium, a header communicating with one end of said spaces, a header in communication with the other end of said spaces, one of said headers in communication with said spaces adjacent to their bottoms and the other header in communication with said spaces adjacent to their tops, means connected with said headers for introducing a heating medium into said spaces and exhausting said medium therefrom, and means including the communications between said spaces and headers whereby the direction of flow of said heating medium may be reversed from top to bottom of said spaces and vice versa at will.

5. A molding apparatus, including a mold box having a plurality of similar double-walled partitions dividing it into a plurality of mold chambers, one wall of each of said partitions provided with an expansible portion, and means for introducing a fluid under pressure between the walls of the partitions for expanding the expansible portions thereof.

6. A molding apparatus, including a mold box having a plurality of similar double-walled partitions dividing it into a plurality of mold chambers, the walls of said partitions forming between them fluid-tight spaces for the reception of a fluid under pressure, one wall of each partition having an expansible portion, and means for introducing a fluid under pressure into said spaces for expanding said expansible portions of the walls thereof.

7. A molding apparatus, including a casting table, a mold box divided into a plurality of compartments forming mold chambers, said mold box provided with means for heating said chambers to hasten the drying of the material being molded whereby the mold box may be repeatedly re-used to produce layers of molded articles in a stack in superposition, a separator curtain for interposition between adjacent layers of articles, and a housing arranged to enclose said stack and in which fluid may be introduced and confined for curing the molded articles.

In testimony whereof I have hereunto set my hand this 16th day of March A. D. 1925.

SIMON LAKE.